United States Patent
Ahmed et al.

(10) Patent No.: US 12,164,627 B2
(45) Date of Patent: Dec. 10, 2024

(54) RE-TRAINING INTRUSION DETECTION FINGERPRINTS IN THE PRESENCE OF AN ATTACKER

(71) Applicant: Intel Corporation, Santa Clara, CA (US)

(72) Inventors: Shabbir Ahmed, Beaverton, OR (US); Marcio Juliato, Portland, OR (US); Vuk Lesi, Cornelius, OR (US); Qian Wang, Portland, OR (US); Manoj Sastry, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 478 days.

(21) Appl. No.: 17/484,689

(22) Filed: Sep. 24, 2021

(65) Prior Publication Data

US 2022/0012331 A1    Jan. 13, 2022

(51) Int. Cl.
  *G06F 21/55*    (2013.01)
  *G06N 5/022*    (2023.01)

(52) U.S. Cl.
  CPC .......... *G06F 21/55* (2013.01); *G06N 5/022* (2013.01); *G06F 2221/034* (2013.01)

(58) Field of Classification Search
  CPC ...... G06F 21/50–556; G06F 2221/034; G06N 5/022
  See application file for complete search history.

(56) References Cited

U.S. PATENT DOCUMENTS

| | | | |
|---|---|---|---|
| 2019/0245872 A1* | 8/2019 | Shin | H04L 12/40 |
| 2020/0372148 A1* | 11/2020 | Alban | H04L 63/1416 |
| 2020/0377057 A1* | 12/2020 | Ahmed | B60R 25/30 |
| 2021/0176246 A1* | 6/2021 | Chapman | H04L 12/40013 |
| 2022/0394045 A1* | 12/2022 | Rosadini | H04L 12/40045 |

FOREIGN PATENT DOCUMENTS

| | | |
|---|---|---|
| CN | 111669352 A | 9/2020 |
| JP | 2009130769 A | 6/2009 |
| WO | 2019026078 A1 | 2/2019 |

OTHER PUBLICATIONS

Cho, Kyong-Tak, and Kang G. Shin. "Viden: Attacker identification on in-vehicle networks." Proceedings of the 2017 ACM SIGSAC Conference on Computer and Communications Security. 2017. (Year: 2017).*
Kneib, Marcel, and Christopher Huth. "Scission: Signal characteristic-based sender identification and intrusion detection in automotive networks." Proceedings of the 2018 ACM SIGSAC Conference on Computer and Communications Security. 2018. ( Year: 2018).*
Cho, Kyong-Tak, and Kang G. Shin. "Fingerprinting electronic control units for vehicle intrusion detection." 25th USENIX Security Symposium (USENIX Security 16). 2016. (Year: 2016).*
European Search Report dated Dec. 21, 2022, for Application No. EP22184263.6 (eight (8) pages).

* cited by examiner

*Primary Examiner* — Madhuri R Herzog
(74) *Attorney, Agent, or Firm* — KDW Firm PLLC

(57) ABSTRACT

Systems, apparatuses, and methods to establish ground truth for an intrusion detection system in the presence of an attacker electronic control unit transmitting masqueraded messages on a communication bus, such as an in-vehicle network bus, are provided.

24 Claims, 9 Drawing Sheets

RE-TRAINING INTRUSION DETECTION FINGERPRINTS IN THE PRESENCE OF AN ATTACKER

BACKGROUND

Communication networks are implemented in a variety of modern systems, such as, automotive, bus, train, industrial vehicle, agricultural vehicle, ship, aircraft, spacecraft, manufacturing, industrial, medical device, health care systems, retail, etc. Often, networking protocols are used to facilitate information communication between components in the system. For example, an in-vehicle network (IVN), like a CAN bus, can be used to provide a message-based protocol facilitating communication between electronic control units (e.g., microcontrollers, sensors, actuators, etc.). However, with the increasing number of electronic control units communicating on such networks, the overall system is exposed to various types of security risks and attack vectors. Thus, identification of the electronic control unit (ECU) transmitting a message is important for an intrusion detection system (IDS) or an active attack prevention (AAP) system.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1A:
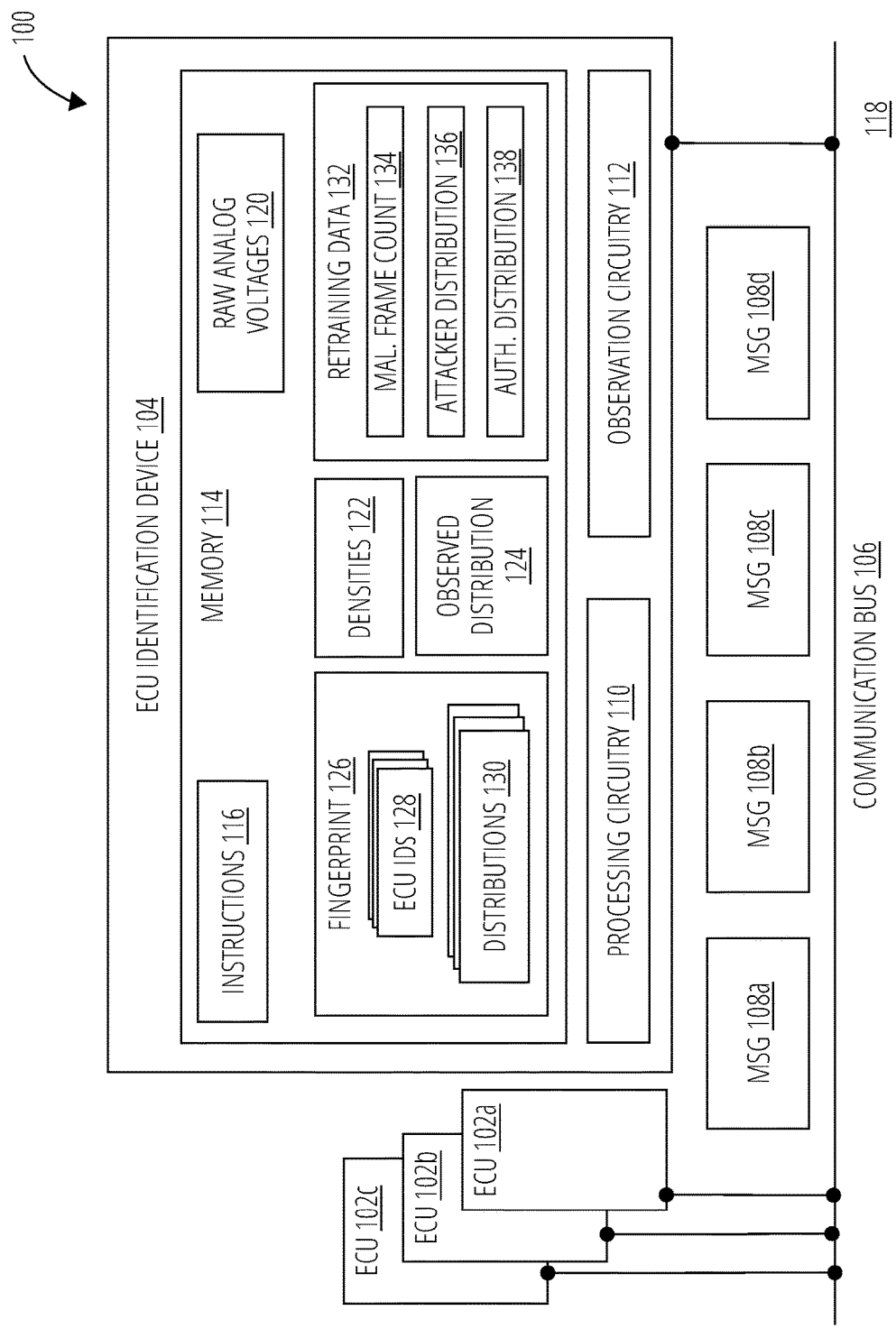
FIG. 1A illustrates a system for retraining fingerprints in the presence of an attacker in accordance with at least one embodiment of the present disclosure.

Modern intrusion detection systems use device fingerprinting, which typically relies on the physical characteristics of devices being fingerprinted. For example, an IDS in a vehicle may leverage voltage characteristics of ECUs transmitting on IVN to generate a fingerprint for each ECU, which fingerprints can subsequently be used to identify ECUs transmitting on the IVN. However, as physical characteristics of the fingerprinted devices change (e.g., due to changes in the operating environment, a shift in context, or the like) fingerprints must necessarily be regenerated, which is often referred to as "retraining." It is to be appreciated that where a malicious entity ("attacker") is present, retraining is problematic as the attacker can mislead the retraining process. The present disclosure provides systems and methods for training and/or retraining fingerprints even in the presence of an attacker.

In some systems, ECUs can be fingerprinted based on their analog voltage waveform. For example, analog waveform data (e.g., data associated with various ECUs transmitting on a bus, or the like) can be captured and a number of histograms can be generated from the analog waveform data. These histograms can be separated into unique groups, which are then used to identify that messages are from a unique source. A density, using a kernel based density function (e.g., a probability density function (PDF), or the like) of the analog waveforms can be derived and subsequently unique distributions for individual ECUs can be identified based on a cumulative distribution function (CDF). Individual ECUs can be fingerprinted based on these CDFs.

The present disclosure provides that for each group of messages identified as originating from the same source (e.g., based on the CDFs, or the like) probable attack messages can be extrapolated and removed from the histogram to accurately complete a fingerprinting process, even in the presence of an attacker.

It is noted that present disclosure can be applied to fingerprint ECUs for a variety of communication busses, which can be implemented in many different contexts, such as, for example, industrial networks, vehicular networks, manufacturing networks, retail operation networks, warehousing networks, or the like. For example, the present disclosure can be applied to fingerprint (or retrain fingerprints) for ECUs transmitting on an IVN (e.g., a CAN bus, or the like). The ECU to be fingerprinted can comprise multiple ECUs for engine control, transmission, airbags, antilock braking, cruise control, electric power steering, audio systems, power windows, power doors, power mirror adjustment, battery, recharging systems for hybrid/electric cars, environmental control systems, auto start stop systems, blind spot monitoring, lane keeping assist systems, collision avoidance systems, and more complex systems in the case of autonomous, or semi-autonomous vehicles. Although vehicular networks are often used in this description as an example implementation, the claims are not limited to networks implemented in a vehicle but can be applied to many contexts.

In the following description, numerous specific details such as processor and system configurations are set forth in order to provide a more thorough understanding of the described embodiments. However, the described embodiments may be practiced without such specific details. Additionally, some well-known structures, circuits, and the like have not been shown in detail, to avoid unnecessarily obscuring the described embodiments.

FIG. 1A illustrates an example system 100, which can be implemented in a vehicle, such as, for example, an automobile, a motorcycle, an airplane, a boat, a personal watercraft, an all-terrain vehicle, or the like. System 100 includes a number of ECUs, for example, ECU 102a, ECU 102b, and ECU 102c are depicted. System 100 further includes ECU identification device 104. System 100 includes a communication bus 106, which can be a CAN bus, a FlexRay bus, a CAN FD bus, an automotive ethernet bus, or a local interconnected network (LIN) bus. Additionally, where implemented in contexts outside of the automotive space, the communication bus 106 can be a network bus adapted to the particular implementation, such as, for example, a communication network for manufacturing equipment, or the like.

In general, each of ECU 102a, ECU 102b, and ECU 102c include circuitry arranged to generate messages and transmit the messages onto communication bus 106 and/or consume messages from communication bus 106. The depicted ECUs (e.g., ECU 102a, ECU 102b, and ECU 102c) can be any of a variety of devices, such as, for example, sensor devices, actuator devices, microprocessor control devices, or the like. For example, the ECUs include circuitry arranged to manipulate voltage levels on communication bus 106 (e.g., see FIG. 2) to communicate messages via the communication bus 106. As depicted, system 100 includes ECU 102a, ECU 102b, and ECU 102c. This is done for clarity of presentation. However, in practice (e.g., in a modern automobile, or the like) hundreds of ECUs may be provided in system 100.

As stated, ECUs are arranged to generate and/or consume messages, where the messages can include data or commands. Specifically, ECUs can convey messages via communication bus 106. As such, messages are depicted on communication bus 106. In particular, this figure depicts a number of messages (MSGs), such as, message 108a, message 108b, message 108c, and message 108d. The number of messages is depicted for purposes of clarity and ease of explanation. Many IVN standards, however, do not provide for indicating source information on the bus. It is to be appreciated that many broadcast communication networks (e.g., IVN schemes, or the like) do not have sufficient bandwidth for conventional cryptography techniques useful to indicate the source of messages, which indication can be used to authenticate the messages. As such, messages (e.g., message 108a, etc.) often include a message identification (MIDI) (not shown) with which receivers can determine whether the message is relevant or not.

The present disclosure provides ECU identification device 104 arranged to train fingerprints or retrain fingerprints for ECUs 102a, 102b, and 102c even in the presence of an attacker (e.g., a malicious ECU, or the like) such that an AAP system or IDS can utilize the fingerprints to determine the authenticity of a source of a message, detect the present of an attacker, or the like. To that end, ECU identification device 104 includes processing circuitry 110, observation circuitry 112, and memory 114. Memory 114 includes instructions 116 (e.g., firmware, or the like) that can be executed by processing circuitry 110 and/or observation circuitry 112. During operation, observation circuitry 112 can observe voltage levels on communication bus 106, for example, at point 118. The observed voltage levels on communication bus 106 can be stored as raw analog voltages 120. For example, processing circuitry 110 can execute instructions 116 to store voltages observed by observation circuitry 112 as raw analog voltages 120.

Processing circuitry 110 can execute instructions 116 to generate densities 122 from raw analog voltages 120 and observed distribution 124 from densities 122. This is explained in greater detail below. However, in general, processing circuitry 110 can execute instructions 116 to generate a PDF (e.g., densities 122) from the analog waveforms (e.g., raw analog voltages 120) and generate a CDF (e.g., observed distribution 124) from the PDF. ECUs (e.g., ECU 102a, ECU 102b, ECU 102c, etc.) can be fingerprinted based on the CDFs. That is, a fingerprint 126 (or ECU fingerprints) comprising ECU IDs 128 and distributions 130 can be generated. For example, processing circuitry 110, in executing instructions 116 can be arranged to generate fingerprint 126 by cycling through each ECU to observe voltages and generate unique distributions (e.g., distributions 130) and insert the distributions 130 along with an ECU identifier (e.g., ECU IDs 128) into the fingerprint 126.

During operation, fingerprint 126 can be used (e.g., by an IDS, or the like) to determine the authenticity of messages transmitted on communication bus 106. For example, processing circuitry 110, in executing instructions 116 can compare the observed distribution 124 to distributions 130 from fingerprint 126 to determine an identity of an ECU sending the message (e.g., messages 108a, 108b, 108c, 108d, etc.). With some examples, processing circuitry 110, in executing instructions 116 can determine the identity based on ECU IDs 128 associated with the distributions 130 from fingerprint 126. In some examples, processing circuitry 110, in executing instructions 116 can compare the observed distribution 124 to distributions 130 using a minimum mean square error (MMSE) metric to match the observed distribution 124 to a distribution from the distributions 130. More specifically, processing circuitry 110 can execute instructions 116 to determine a distance between the observed distribution 124 and ones of distributions 130 from fingerprint 126. The distribution of the distributions 130 having the smallest distance may be identified as matching the observed distribution 124 and the source of the message associated with the observed distribution 124 can be identified based on ECU IDs 128. As another example, the distribution of the distributions 130 having the smallest distance less than a threshold value may be identified as matching the observed distribution 124.

It is to be appreciated that retraining in the presence of an attacker will change the distributions 130. For example, if two ECUs (e.g., ECU 102a and ECU 102c) each send messages identified as from ECU 102a then the unique distribution of distributions 130 associated with ECU 102a will be incorrect as it would be based on raw analog voltages 120, densities 122, and observed distribution 124 from both ECU 102a and ECU 102c. The present disclosure provides to isolate densities 122 from attacker ECUs and remove them from observed distribution 124 during retraining. Although this is described in greater detail below, a brief high level overview of retraining in the presence of an attacker is described. In general, memory 114 can comprise retraining data 132 including malicious frame count 134, attacker distribution 136, and authentic distribution 138. During retraining, physical characteristics (e.g., raw analog voltages 120, or the like) for messages transmitted by ECUs can be observed. Fingerprint 126 can be updated based on transmitted messages and their associated MID and observed physical characteristics (e.g., raw analog voltages 120). During retraining, a determination as to whether malicious frames are encountered based on the retraining is made. A count of the number of malicious frames detected during retraining can be recorded in malicious frame count 134 and a mitigation method initiated where malicious frame count 134 is greater than a threshold (e.g., greater than 1, greater than or equal to 2, greater than or equal to 5, etc.). An example of this retraining process and malicious frame detection is proved in FIG. 3 and method 300. Where malicious frames are detected during retraining, mitigation methods can be initiated, which are described in FIG. 4 and method 400 as well as FIG. 5 and method 500. In general however, an attacker distribution 136 and an authentic distribution 138 can be generated and fingerprint 126 updated based on the observed distribution 124, the attacker distribution 136, and the authentic distribution 138.

Processing circuitry 110 can include any of a variety of processors, such as, for example, commercial central processing units, application specific integrated circuits, or the like. Processing circuitry 110 can be a microprocessor or a commercial processor and can include one or multiple processing core(s) and can also include cache.

Observation circuitry 112 can include circuitry such as, analog to digital converters, voltage measurement circuitry, voltage waveform observation circuitry (e.g., oscilloscope circuitry, or the like) arranged to observe voltage transitions.

Memory 114 can be based on any of a wide variety of information storage technologies. For example, memory 114 can be based on volatile technologies requiring the uninterrupted provision of electric power or non-volatile technologies that do not require and possibly including technologies entailing the use of machine-readable storage media that may or may not be removable. Thus, each of these storages may include any of a wide variety of types (or combination of types) of storage devices, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). Additionally, memory 114 can include storage devices.

Figure 1B:
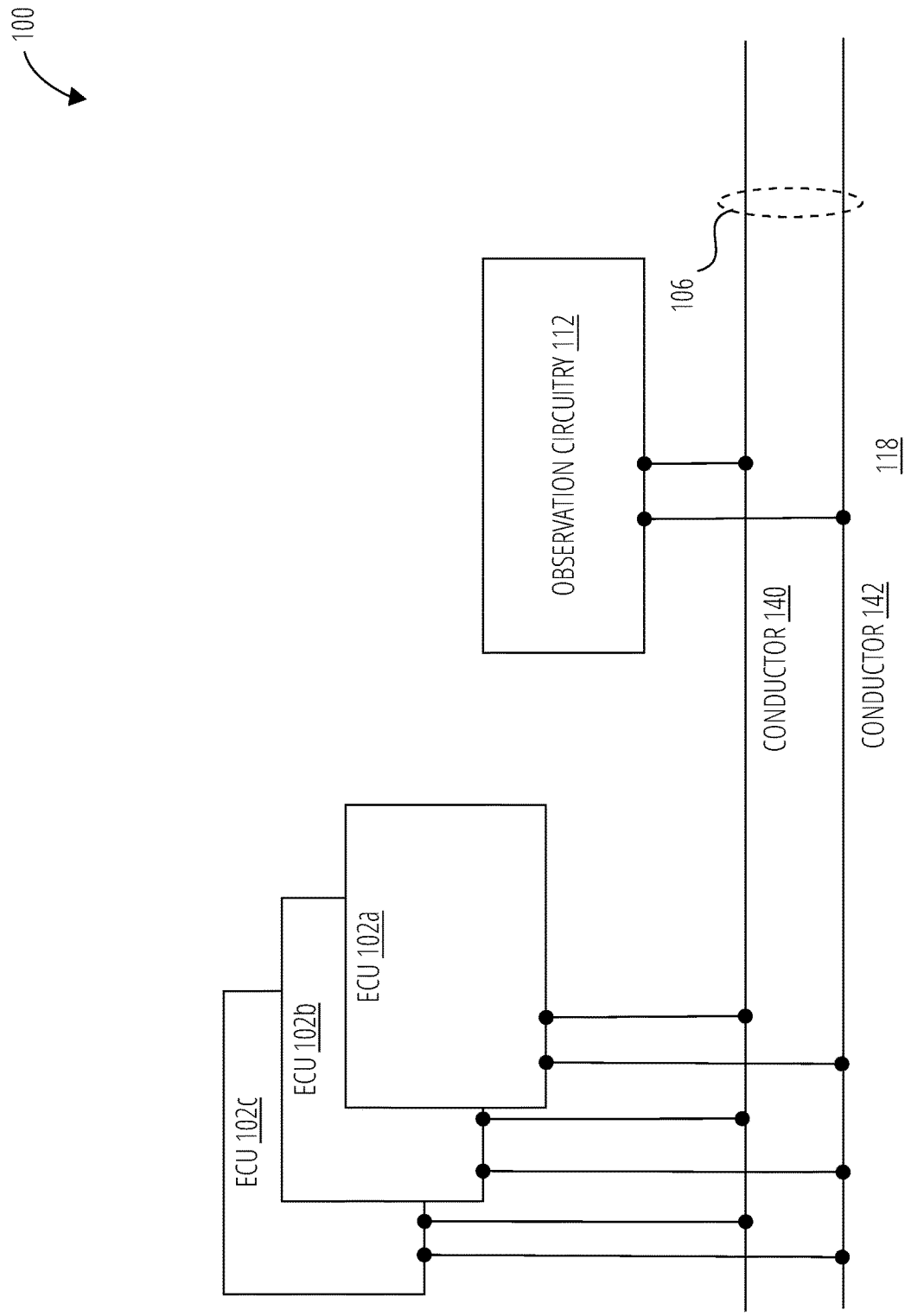
FIG. 1B illustrates a portion of the system of FIG. 1A in greater detail.

FIG. 1B illustrates system 100, which can be system 100 of FIG. 1A in alternate detail. As depicted, system 100 includes ECU 102a, ECU 102b, ECU 102c and observation circuitry 112. Further, as described herein, communication bus 106 can comprise a pair of conductors, such as conductor 140 and conductor 142. During operation, ECUs (e.g., ECU 102a, ECU 102b, ECU 102c, or the like) can communicate signals via conductor 140 and conductor 142 and observation circuitry 112 can observe analog voltages from conductor 140 and conductor 142 at point 118. As will be described in greater detail below, densities 122 and observed distribution 124 for the analog voltages represented on both conductors (either individually or combined) of communication bus 106 can be generated.

Figure 2:
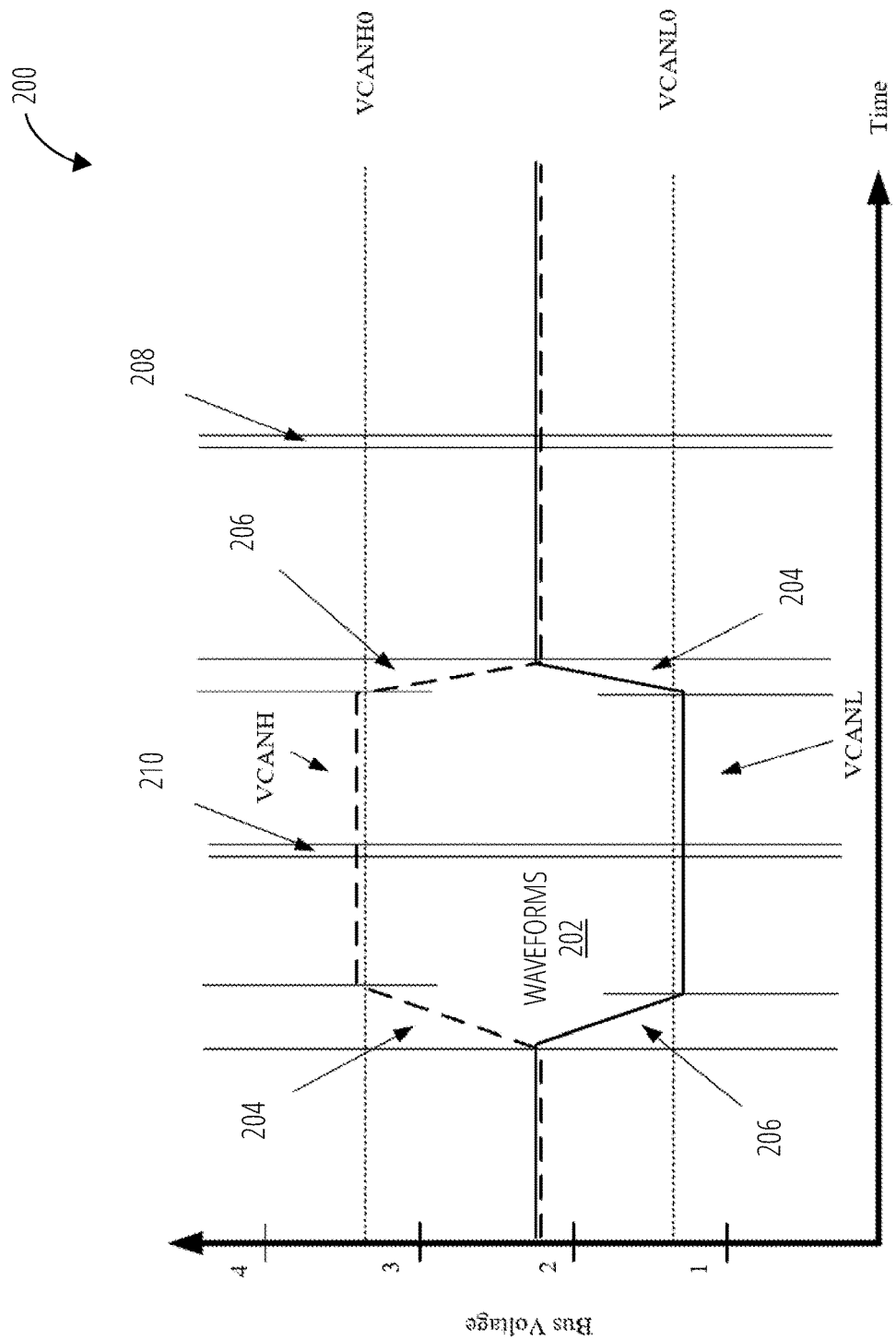
FIG. 2 illustrates a graph accordance with at least one embodiment of the present disclosure.

As a specific example, communication bus 106 can be an IVN comprising a CANH conductor (e.g., conductor 140) and a CANL conductor (e.g., conductor 142). Accordingly, FIG. 2 illustrates graph 200, showing example waveforms 202 undergoing voltage transitions. Although the present disclosure can be implemented for IVNs (e.g., the CAN bus, or the like) and the waveforms 202 are described with reference to the CAN bus, examples are not limited in this regard. FIG. 2 depicts nominal recessive and dominant bus voltages for a CAN bus. The CAN bus is comprised of two conductors, as such two waveforms 202 are depicted.

When an ECU (e.g., ECU 102a, ECU 102b, ECU 102c, or the like) sends a 0 bit, it does so by increasing a first voltage (VCANH coupled to CANH) to at least VCANH0 and decreasing a second voltage (VCANL coupled to CANL) to at least VCANL0. For example, VCANH0 may be about 3.5 volts (V), while the VCANL0 may be about 1.5V. It is noted, that the term "about" may mean within a threshold value (e.g., 1%, or the like) and can be dependent upon the bus standard, which may dictate the tolerance. In the recessive state, either the CAN bus (e.g., communication bus 106) is idle or an ECU is transmitting a logic 1. In the dominant state, at least one ECU is transmitting a logic 0. Thus, each waveform on the CAN bus can go through a number of voltage transitions.

These voltage transitions are measured as a voltage over time and correspond to a portion of the overall voltage waveform. In particular, waveforms 202 can have a rising edge transition 204 or a falling edge transition 206. Additionally, waveforms 202 can have a steady state transition 208 and a steady state transition 210. That is, waveforms 202 can have a steady state transition 210 for both the recessive state as well as a steady state transition 208 for the dominant state. To send a message (e.g., message 108a, message 108b, message 108c, message 108d, or the like) on the CAN bus, an ECU must cause a number of voltage transitions (e.g., rising edge transition 204, falling edge transition 206, steady state transition 208, and/or steady state transition 210) on the CAN bus to communicate bits indicating the contents of the message. Accordingly, during operation, analog voltage waveforms corresponding to messages (e.g., message 108a, message 108b, message 108c, etc.) can be observed on conductor(s) of communication bus 106.

Figure 3:
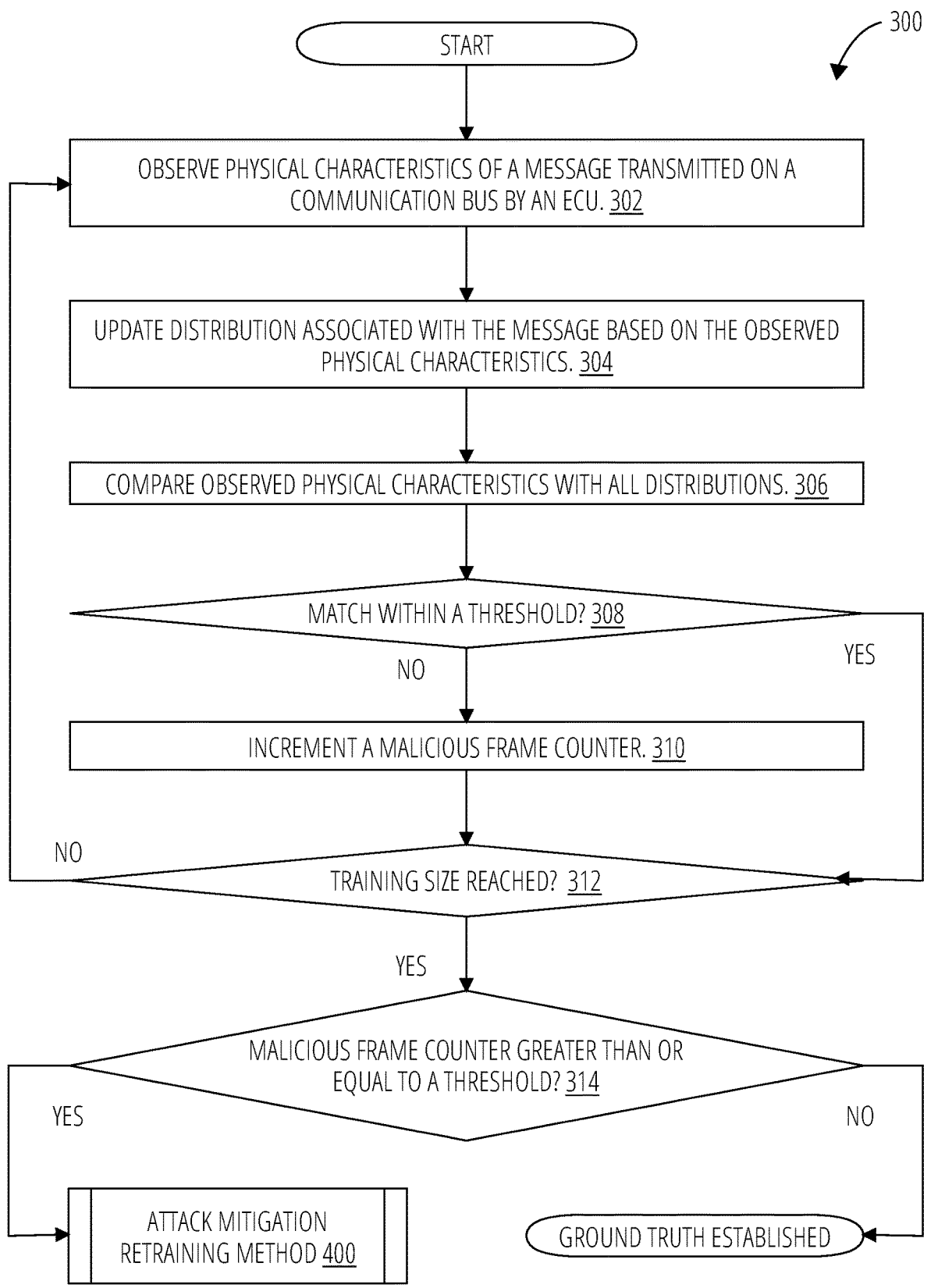
FIG. 3 illustrates a method for identifying attackers during retraining of fingerprints after a context shift in accordance with at least one embodiment of the present disclosure

FIG. 3 illustrates the method 300 for retraining a fingerprint in the presence of an attacker, in accordance with non-limiting example(s) of the present disclosure. Method 300 can be implemented by an IDS or AAP system, (e.g., by ECU identification device 104 of system 100, or the like) to retrain (or update) fingerprints of devices in the system after a context shift. Method 300 can begin at block 302. At block 302 "observe physical characteristics of a message transmitted on a communication bus by an ECU" physical characteristics (e.g., analog voltages, or the like) of a message transmitted on a communication bus by an ECU can be observed. Observation circuitry 112 can observe physical characteristics of one of message 108a or etc., transmitted by one of ECUs 102a, 102b, or 102c and can generate raw analog voltages 120 from the observation.

Continuing to block 304 "update distribution associated with the message based on the observed physical characteristics" distributions associated with the message (e.g., the ECU, the MID, etc.) can be updated. For example, processing circuitry 110 can execute instructions 116 to generate and/or update distributions 130 in fingerprint 126 from the raw analog voltages 120, densities 122, and observed distribution 124 of the message received at block 302. As outlined above, fingerprint 126 can include a distributions 130 for each ECU in system 100 or for each unique message (e.g., MID, or the like) observed on communication bus 106.

Continuing to block 306 "compare the observed physical characteristics with all distributions" the observed physical characteristics for all distributions can be observed. For example, processing circuitry 110 can execute instructions 116 to compare the raw analog voltages 120 for the message observed at block 302 to all distributions 130. Continuing to decision block 308 "match within a threshold?" a determination of whether the observed physical characteristics matches any of the distributions 130 within a threshold amount. With some examples, 110 can execute instructions 116 to compare raw analog voltages 120 (or rather observed distribution 124) to the distributions 130 and determine whether the observed distribution 124 is within a threshold distance (e.g., MSEE, or the like) to any one of the distributions 130.

From decision block 308, method 300 can continue to block 310 or decision block 312. In particular, method 300 can continue from decision block 308 to block 310 based on a determination that the physical characteristic for the message observed at block 302 is not within a threshold distance to any of the distributions 130. In such a case, it can be assumed that the message is unauthentic (or an attack message). For example, the message could be transmitted by an ECU masquerading as another ECU, in which case the physical characteristics would not match the distributions 130 associated with the MID or ECU as the distributions 130 is based on the observed physical characteristics of both the authentic ECU and the attacker ECU. In the alternative case, method 300 can continue from decision block 308 to decision block 312 based on a determination that the physical characteristic for the message observed at block 302 is within a threshold distance to any of the distributions 130. In such a case, it can be assumed that the message is authentic and retraining proceeds normally.

At block 310 "increment a malicious frame counter" a malicious frame counter can be incremented. For example, processing circuitry 110 can execute instructions 116 to increment a counter (e.g., register in processing circuitry 110, data structure stored in memory 114, or the like) to store an indication of the number of malicious frames detected. From block 310, method 300 can continue to decision block 312. At decision block 312 "training size reached" a determination as to whether the number of frames needed retrain fingerprint 126 has been observed. For example, in some implementations, retraining (e.g., method 300) can continue until a specified number of messages are observed, until a specified time period has elapsed, or until a specified number of messages for each unique MID are observed. Processing circuitry 110 can execute instructions 116 to determine whether the "training size" has been reached, or rather whether retraining has sufficient data to be completed. From decision block 312, method 300 can continue to decision block 314 or return to block 302. In particular, method 300 can return to block 302 from decision block 312 based on a determination that the training size has not been reached while method 300 can continue to decision block 314 from decision block 312 based on a determination that the training size has been reached.

At decision block 314 "malicious frame counter greater than or equal to a threshold?" a determination of whether the value indicated in the malicious frame counter is greater than or equal to a threshold value. As noted, in some examples, the malicious frame count threshold can be 1, 2, 5, etc. From decision block 314, method 300 can continue to method 400 or can end with the retraining complete and ground truth established. As used herein, "ground truth" shall be interpreted to mean mapping of unique ECU signatures (e.g., voltage signatures, distributions 130, or the like) to message IDs (MIDs) with which the ECUs are transmitting, such as described with respect to fingerprint 126 above. In particular, method 300 can end after decision block 314 based on a determination that the value in the malicious frame counter is not greater than or equal to the threshold malicious frame count while method 300 can proceed to method 400, to implement attack mitigation retraining, based on a determination that the value in the malicious frame counter is greater than or equal to the threshold malicious frame count.

Figure 4:
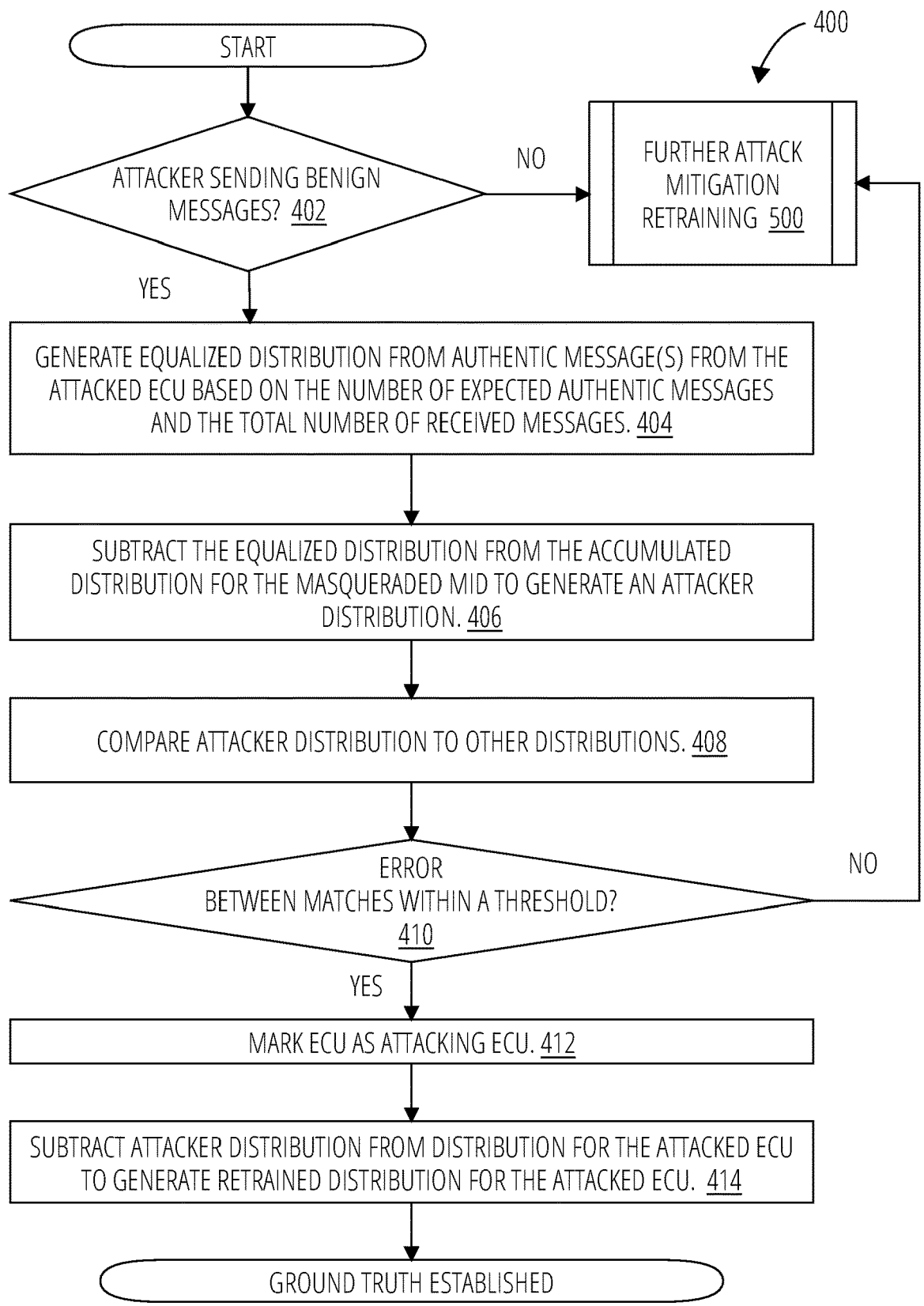
FIG. 4 illustrates a method for retraining fingerprints in the presence of an attacker in accordance with at least one embodiment of the present disclosure

FIG. 4 illustrates the method 400 for retraining a fingerprint in the presence of an attacker, in accordance with non-limiting example(s) of the present disclosure. Method 400 can be implemented by an IDS or AAP system, (e.g., by ECU identification device 104 of system 100, or the like) to retrain (or update) fingerprints of devices in the system after a context shift and to mitigate the effects of the presence of an attacker on the retraining. Method 400 can begin at decision block 402 "attacker sending benign messages?" a determination as to whether the attacker ECU is also sending benign messages is made. For example, processing circuitry 110 can execute instructions 116 to determine whether attacker distribution 136 matches one of distributions 130 from retrained fingerprint 126. For example, where the attacker ECU (e.g., ECU 102c from the example elaborated above) is transmitting messages with MID1 as an attack on ECU 102a but also transmits benign messages with another MID, then distributions 130 from retrained fingerprint 126 will include a distribution associated with ECU 102c.

From decision block 402, method 400 can continue to method 500 or block 404. In particular, method 400 can continue from decision block 402 to method 500 based on a determination that the attacker is not sending benign messages while method 400 can continue from decision block 402 to block 408 based on a determination that the attacked is sending benign messages.

At block 404 "generate equalized distributions from authentic message from the attacked ECU based on the number of expected authentic messages and the total number of received messages" equalized distributions based on an observed physical characteristics of a number of authentic messages (e.g., one, two, three, etc.) and the number of expected authentic messages as well as the total number of messages is generated. For example, during retraining, the number of benign retraining messages or expected retraining messages for each ECU and/or each MID is known. Assume that ECU 102a transmits messages with unique MID1 and unique MID3 while ECU 102b transmits messages with unique MID 2. During retraining, it is known how many messages with MID1, MID2, and MID3 are expected to be observed on communication bus 106. Further assume that each unique MID is expected to be observed four (4) times. However, in the case of a malicious actor, for example, ECU 102c transmitting messages with MID1 in an attempt to masquerade as ECU 102a more than the expected number of messages with MID1 will be observed. As outlined above with respect to method 300 and FIG. 3, these additional messages can be flagged as malicious and a malicious frame counter incremented based on identifying these messages. Method 400 provides to mitigate the effects of these malicious (or extra) messages from fingerprint 126.

Accordingly, using the example above, processing circuitry 110 can execute instructions 116 to generate an equalized distribution (not shown) from observed distribution 124 associated with an authentic message transmitted for a particular unique MID. For example, using the hypothetical elaborated above, processing circuitry 110 can execute instructions 116 to generate an equalized distribution by equalizing the observed distribution 124 for an authentic message with MID1 transmitted by ECU 102a to the number of expected authentic frames (e.g., four (4) continuing with the example above).

Continuing to block 406 "subtract the equalized distribution from the accumulated distribution for the masqueraded MID to generate an attacker distribution" the equalized distribution generated at block 404 can be subtracted from the accumulated distribution for the unique MID or ECU. Said differently, processing circuitry 110 can execute instructions 116 to subtract the equalized distribution generated at block 402 from the distribution of distributions 130 associated with the MID generated during retraining of fingerprint 126 (e.g., during method 300, etc.) to generate attacker distribution 136.

Continuing to block 408 "compare attacker distribution to the other distributions" the attacker distribution 136 can be compared to distributions 130 from the retrained fingerprint 126. For example, processing circuitry 110 can execute instructions 116 to compare distributions 130 with attacker distribution 136.

Continuing to decision block 410 "error between matches within a threshold?" a determination of whether the attacker distribution 136 matches any of the distributions 130 to within a threshold amount. With some examples, 110 can execute instructions 116 to compare attacker distribution 136 to the distributions 130 and determine whether the attacker distribution 136 is within a threshold distance (e.g., MSEE, or the like) to any one of the distributions 130. From decision block 410, method 400 can continue to block 412 or method 500. In particular, method 400 can continue from decision block 410 to block 412 based on a determination that the attacker distribution 136 is within a threshold distance to a one of the distributions 130. In such a case, it can be assumed that the distribution of distributions 130 is associated with he attacker ECU (E.g., ECU 102c from the example above). In the alternative case, method 400 can continue from decision block 410 to method 500 based on a determination that the attacker distribution 136 is not within a threshold distance to any of the distributions 130.

At block 412 "mark ECU as attacking ECU" an indication that the distribution of distributions 130 matching the attacker distribution 136 is associated with the attacking ECU can be made. For example, processing circuitry 110 can execute instructions 116 to add a flag, alert, or the like in fingerprint 126 indicating that the distribution of distributions 130 is associated with a malicious ECU. The overall IDS with which ECU identification device 104 is implemented can take other mitigation actions to prevent malicious behavior by that ECU.

Continuing to block 414 "subtract the attacker distribution from the accumulated distribution for the masqueraded MID to generate retrained distribution for the MID" the attacker distribution can be subtracted from the accumulated distribution for the unique MID or ECU. Said differently, processing circuitry 110 can execute instructions 116 to subtract the attacker distribution 136 generated at block 404 from the distribution of distributions 130 associated with the MID (e.g., MID1 when continuing the example elaborated above, or the like) generated during retraining of fingerprint 126 (e.g., during method 300, etc.) to generate a retrained distributions 130 for the MID. From block 414, method 400 can end with ground truth established.

Figure 5:
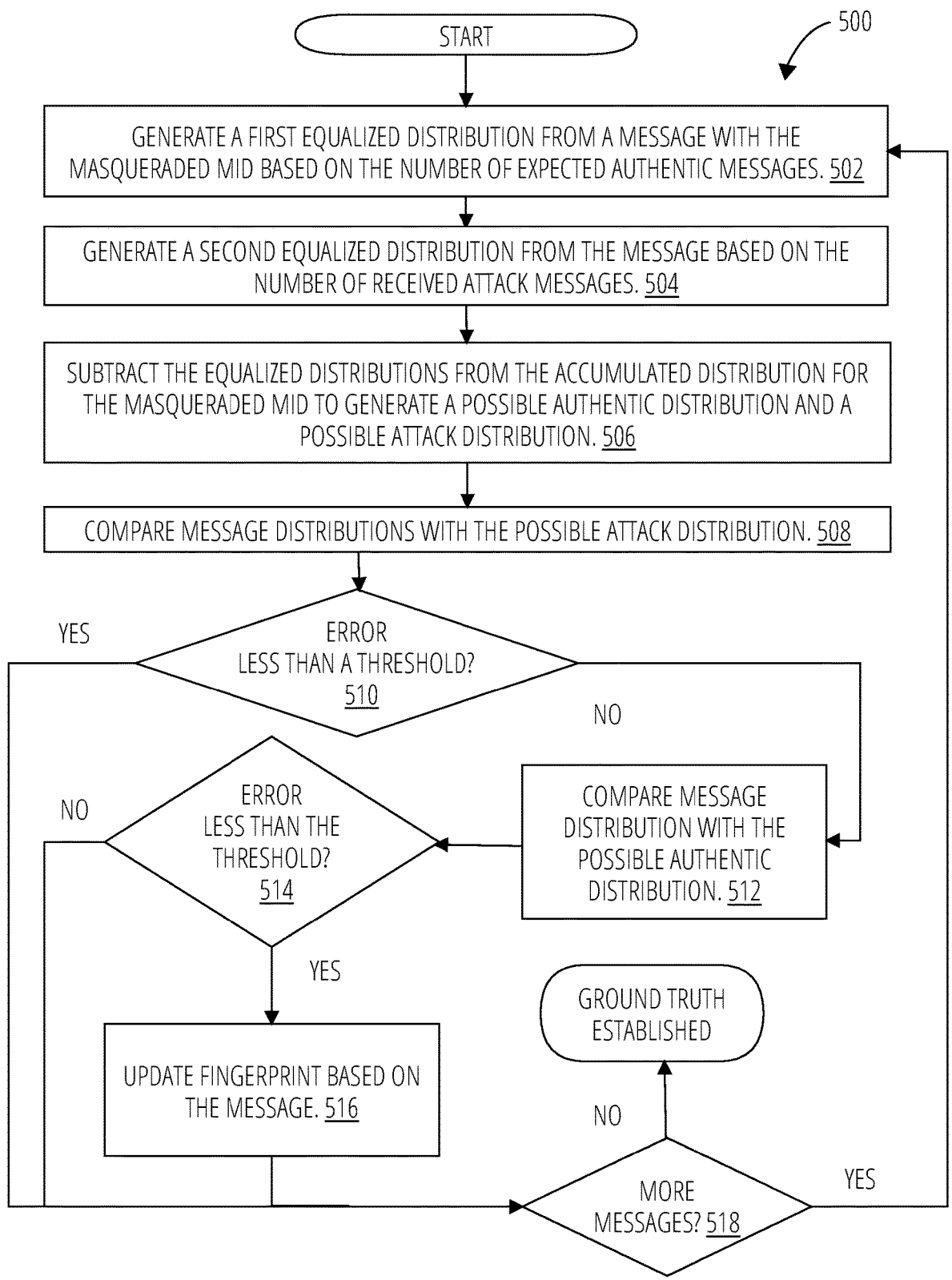
FIG. 5 illustrates another method for retraining fingerprints in the presence of an attacker in accordance with at least one embodiment of the present disclosure.

FIG. 5 illustrates the method 500 for retraining a fingerprint in the presence of an attacker, in accordance with non-limiting example(s) of the present disclosure. Method 500 can be implemented by an IDS or AAP system, (e.g., by ECU identification device 104 of system 100, or the like) to retrain (or update) fingerprints of devices in the system after a context shift and to mitigate the effects of the presence of an attacker on the retraining. In particular, method 500 can be implemented to mitigate the effects of an attacker on retaining where the attacker is not sending benign messages but only sends masqueraded messages.

Method 500 can begin at block 502. At block 502 "generate a first equalized distribution from a message with the masqueraded MID based on the number of expected authentic messages" a first equalized distribution based on an observed physical characteristics of a message having an MID matching the masqueraded MID is generated based on the number of expected authentic messages. It is noted, that the message can be either authentic or malicious. That is, the message can originate from either the authentic ECU or the attack ECU. In particular, processing circuitry 110 can execute instructions 116 to generate an equalized distribution (not shown) from observed distribution 124 associated with a message transmitted (by either the authentic ECU or the attacker ECU) for a particular unique MID. For example, using the hypothetical elaborated above, processing circuitry 110 can execute instructions 116 to generate an equalized distribution by equalizing the observed distribution 124 for a message with MID1 transmitted by ECU 102a or ECU 102c to the number of expected authentic frames.

Continuing to block 504 "generate a second equalized distribution from the message based on the number of received attack messages" a second equalized distribution based on the observed physical characteristics of the message having the MID matching the masqueraded MID is generated based on the number of received attack messages. It is noted, that the message can be either authentic or malicious. That is, the message can originate from either the authentic ECU or the attack ECU. In particular, processing circuitry 110 can execute instructions 116 to generate an equalized distribution (not shown) from observed distribution 124 associated with a message transmitted (by either the authentic ECU or the attacker ECU) for a particular unique MID. For example, using the hypothetical elaborated above, processing circuitry 110 can execute instructions 116 to generate an equalized distribution by equalizing the observed distribution 124 for a message with MID1 transmitted by ECU 102a or ECU 102c to the number of received attack frames.

Continuing to block 506 "subtract the equalized distributions from the accumulated distribution for the masqueraded MID to generate (1) a possible authentic distribution and (2) a possible attack distribution" the equalized distributions generated at block 502 and block 504 can be subtracted from the accumulated distribution for all message (both authentic and inauthentic) transmitted with the unique MID. Said differently, processing circuitry 110 can execute instructions 116 to subtract the equalized distributions generated at block 502 and block 504 from the distribution of distributions 130 associated with the MID generated during retraining of fingerprint 126 (e.g., during method 300, etc.) to generate a possible authentic distribution 138 and a possible attacker distribution 136.

Continuing to block 508 "compare the distribution of the message to the possible attacker distribution" the possible attacker distribution 136 can be compared to the observed distribution 124 for the message from block 502 and block 504. As such, at block 508, processing circuitry 110 can execute instructions 116 to compare observed distribution 124 from the message processed at block 502 and 504 with possible attacker distribution 136. Continuing to decision block 510 "error less than a threshold?" a determination of whether the error between the attacker distribution 136 and observed distribution 124 is less than a threshold amount. With some examples, 110 can execute instructions 116 to compare attacker distribution 136 to the observed distribution 124 and determine whether the attacker distribution 136 is within a threshold distance (e.g., MSEE, or the like) to observed distribution 124. From decision block 510, method 500 can continue to block 512 or decision block 518. In particular, method 500 can continue from decision block 510 to block 512 based on a determination that the attacker distribution 136 is not within a threshold distance to observed distribution 124. In such a case, it can be assumed that the message is not from the masquerading ECU (e.g., ECU 102c using the example above). In the alternative case, method 500 can continue from decision block 510 to decision block 518 based on a determination that the attacker distribution 136 is within a threshold distance to observed distribution 124.

At block 512 "compare distribution of the message with the possible authentic distribution" the possible authentic distribution 138 can be compared to the observed distribution 124 for the message from block 502 and block 504. For example, processing circuitry 110 can execute instructions 116 to compare observed distribution 124 with the possible authentic distribution 138. Continuing to decision block 514 "error less than a threshold?" a determination of whether the error between the possible authentic distribution 138 and observed distribution 124 is less than a threshold amount. With some examples, 110 can execute instructions 116 to compare authentic distribution 138 to the observed distribution 124 and determine whether the authentic distribution 138 is within a threshold distance (e.g., MSEE, or the like) to observed distribution 124. From decision block 514, method 500 can continue to block 516 or decision block 518. In particular, method 500 can continue from decision block 514 to block 516 based on a determination that the authentic distribution 138 is within a threshold distance to observed distribution 124. In such a case, it can be assumed that the message is from the authentic ECU (e.g., ECU 102a using the example above). In the alternative case, method 500 can continue from decision block 514 to decision block 518 based on a determination that the authentic distribution 138 is not within a threshold distance to observed distribution 124.

At block 516 "update fingerprint based on the message" the fingerprint 126 can be updated based on the observed physical characteristics of the message. For example, processing circuitry 110 can execute instructions 116 to update distributions 130 for the MID under attack based on the observed distribution 124 for the message selected at block 506. From block 516, method 500 can continue to decision block 518. At decision block 518 "more messages?" a determination of whether more messages transmitted with the MID under attack (e.g., MID1 using the example above) need to be processed. For example, processing circuitry 110 can execute instructions 116 to determine whether messages transmitted with the MID under attack need to be processed through method 500. That is, a fingerprint for a MID flagged as under attacked (e.g., MID1 using the example above) can be iteratively retrained based on all messages transmitted with that MID using method 500.

From decision block 518, method 500 can return to block 502 or can end the retraining with ground truth established. In particular, method 500 can end after decision block 518 based on a determination that there are not more messages to process while method 500 can return to 502, to process more messages, based on a determination that there are more messages to process.

Figure 6:
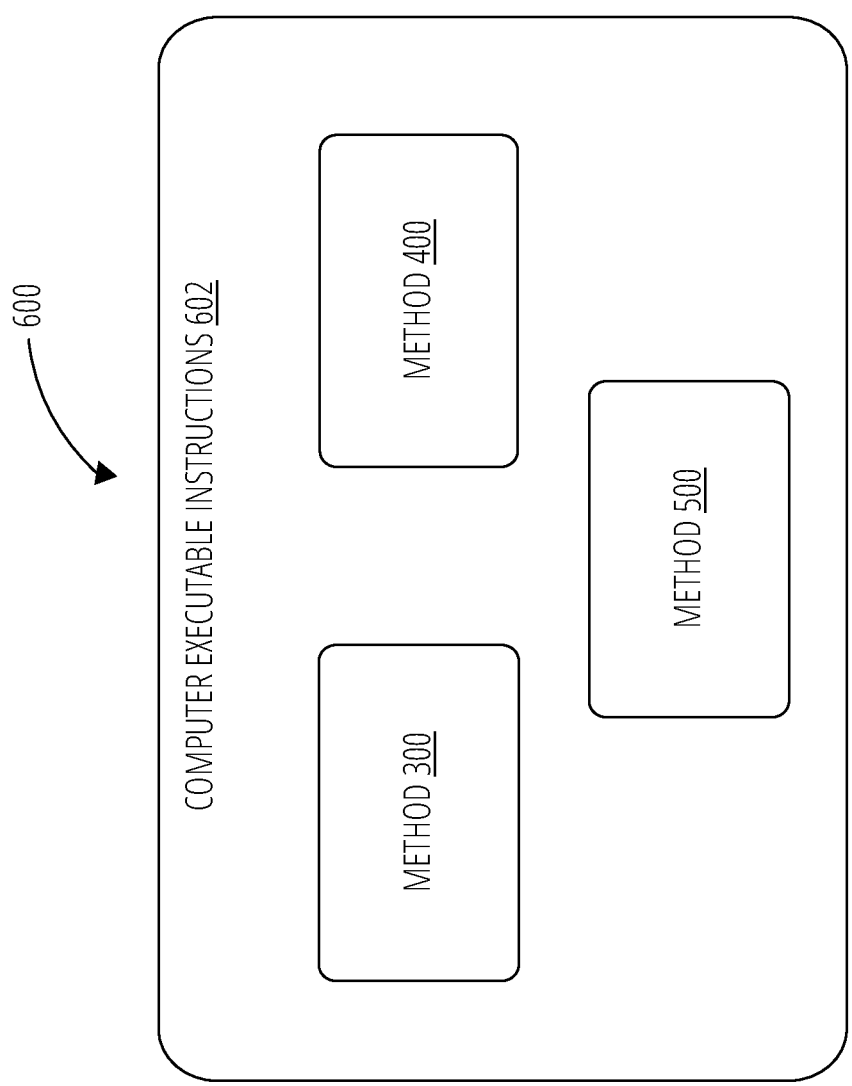
FIG. 6 illustrates a storage device in accordance with at least one embodiment of the present disclosure.

FIG. 6 illustrates an example of a storage device 600. Storage device 600 may comprise an article of manufacture, such as, any non-transitory computer readable medium or machine readable medium, such as an optical, magnetic or semiconductor storage. Storage device 600 may store various types of computer executable instructions 602, such as instructions to implement method 300, method 400, and/or method 500. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 7:
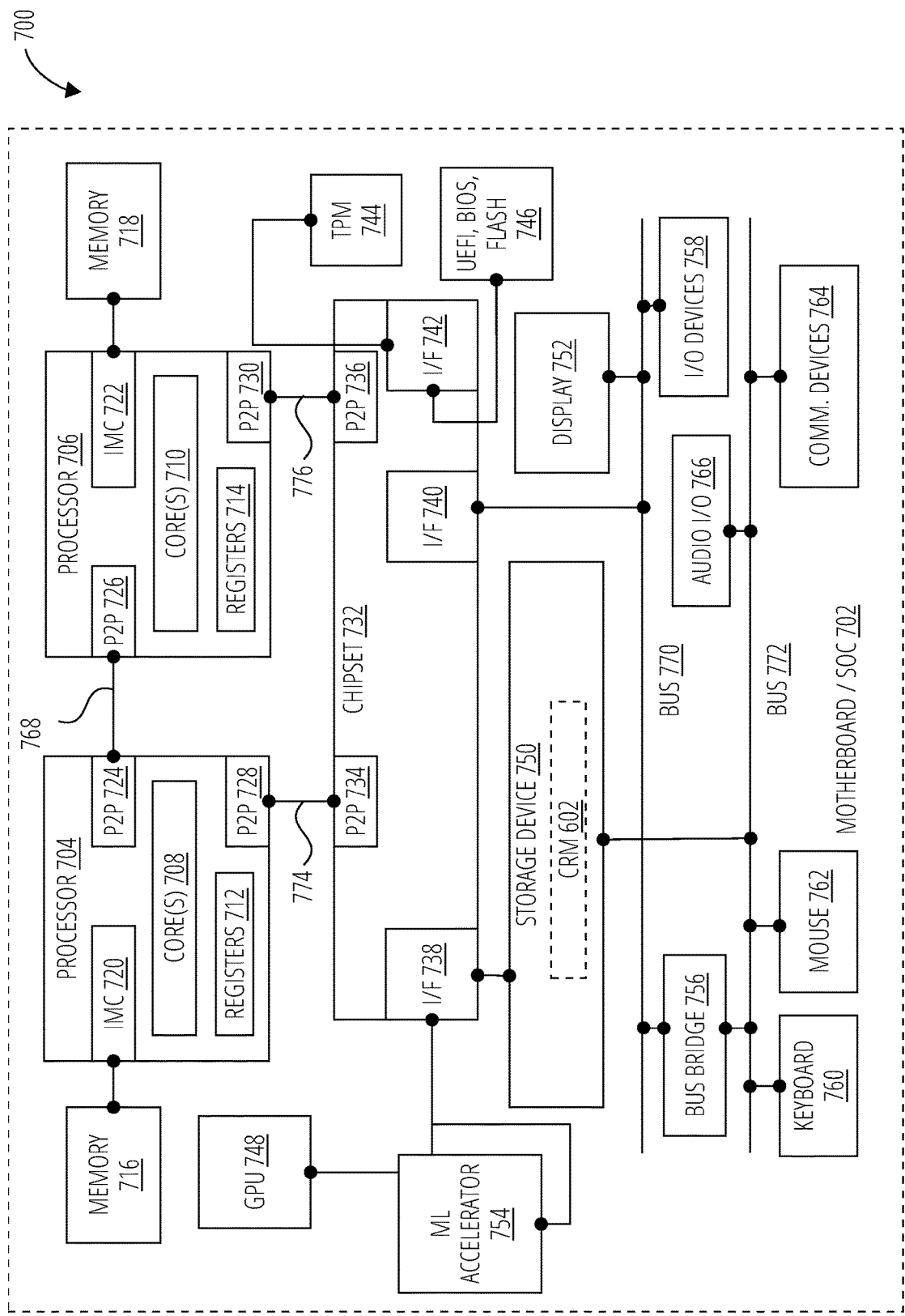
FIG. 7 illustrates a system in accordance with at least one embodiment of the present disclosure.

FIG. 7 illustrates an embodiment of a system 700. System 700 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 700 may have a single processor with one core or more than one processor. Note that the term "processor" refers to a processor with a single core or a processor package with multiple processor cores. In at least one embodiment, the computing system 700 is representative of the components of the system 100. More generally, the computing system 700 is configured to implement all logic, systems, logic flows, methods, apparatuses, and functionality described herein with reference to FIG. 1A and FIG. 1B.

As used in this application, the terms "system" and "component" and "module" are intended to refer to a computer-related entity, either hardware, a combination of hardware and software, software, or software in execution, examples of which are provided by the exemplary system 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in this figure, system 700 comprises a motherboard or system-on-chip (SoC) 702 for mounting platform components. Motherboard or system-on-chip (SoC) 702 is a point-to-point (P2P) interconnect platform that includes a first processor 704 and a second processor 706 coupled via a point-to-point interconnect 768 such as an Ultra Path Interconnect (UPI). In other embodiments, the system 700 may be of another bus architecture, such as a multi-drop bus. Furthermore, each of processor 704 and processor 706 may be processor packages with multiple processor cores including core(s) 708 and core(s) 710, respectively. While the system 700 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processor 704 and chipset 732. Some platforms may include additional components and some platforms may only include sockets to mount the processors and/or the chipset. Furthermore, some platforms may not have sockets (e.g. SoC, or the like).

The processor 704 and processor 706 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi processor architectures may also be employed as the processor 704 and/or processor 706. Additionally, the processor 704 need not be identical to processor 706.

Processor 704 includes an integrated memory controller (IMC) 720 and point-to-point (P2P) interface 724 and P2P interface 728. Similarly, the processor 706 includes an IMC 722 as well as P2P interface 726 and P2P interface 730. IMC 720 and IMC 722 couple the processors processor 704 and processor 706, respectively, to respective memories (e.g., memory 716 and memory 718). Memory 716 and memory 718 may be portions of the main memory (e.g., a dynamic random-access memory (DRAM)) for the platform such as double data rate type 3 (DDR3) or type 4 (DDR4) synchronous DRAM (SDRAM). In the present embodiment, the memories memory 716 and memory 718 locally attach to the respective processors (i.e., processor 704 and processor 706). In other embodiments, the main memory may couple with the processors via a bus and shared memory hub.

System 700 includes chipset 732 coupled to processor 704 and processor 706. Furthermore, chipset 732 can be coupled to storage device 750, for example, via an interface (I/F) 738. The I/F 738 may be, for example, a Peripheral Component Interconnect-enhanced (PCI-e).

Processor 704 couples to a chipset 732 via P2P interface 728 and P2P 734 while processor 706 couples to a chipset 732 via P2P interface 730 and P2P 736. Direct media interface (DMI) 774 and DMI 776 may couple the P2P interface 728 and the P2P 734 and the P2P interface 730 and P2P 736, respectively. DMI 774 and DMI 776 may be a high-speed interconnect that facilitates, e.g., eight Giga Transfers per second (GT/s) such as DMI 3.0. In other embodiments, the processor 704 and processor 706 may interconnect via a bus.

The chipset 732 may comprise a controller hub such as a platform controller hub (PCH). The chipset 732 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 732 may comprise more than one controller hub such as a chipset with a memory controller hub, a graphics controller hub, and an input/output (I/O) controller hub.

In the depicted example, chipset 732 couples with a trusted platform module (TPM) 744 and UEFI, BIOS, FLASH circuitry 746 via I/F 742. The TPM 744 is a dedicated microcontroller designed to secure hardware by integrating cryptographic keys into devices. The UEFI, BIOS, FLASH circuitry 746 may provide pre-boot code.

Furthermore, chipset 732 includes the I/F 738 to couple chipset 732 with a high-performance graphics engine, such as, graphics processing circuitry or a graphics processing unit (GPU) 748. In other embodiments, the system 700 may include a flexible display interface (FDI) (not shown) between the processor 704 and/or the processor 706 and the chipset 732. The FDI interconnects a graphics processor core in one or more of processor 704 and/or processor 706 with the chipset 732. Additionally, ML accelerator 754 coupled to chipset 732 via I/F 738. ML accelerator 754 can be circuitry arranged to execute ML related operations (e.g., training, inference, etc.) for ML models. In particular, ML accelerator 754 can be arranged to execute mathematical operations and/or operands useful for machine learning.

Various I/O devices 758 and display 752 couple to the bus 770, along with a bus bridge 756 which couples the bus 770 to a second bus 772 and an I/F 740 that connects the bus 770 with the chipset 732. In one embodiment, the second bus 772 may be a low pin count (LPC) bus. Various devices may couple to the second bus 772 including, for example, a keyboard 760, a mouse 762 and communication devices 764.

Furthermore, an audio I/O 766 may couple to second bus 772. Many of the I/O devices 758 and communication devices 764 may reside on the motherboard or system-on-chip(SoC) 702 while the keyboard 760 and the mouse 762 may be add-on peripherals. In other embodiments, some or all the I/O devices 758 and communication devices 764 are add-on peripherals and do not reside on the motherboard or system-on-chip(SoC) 702.

Figure 8:
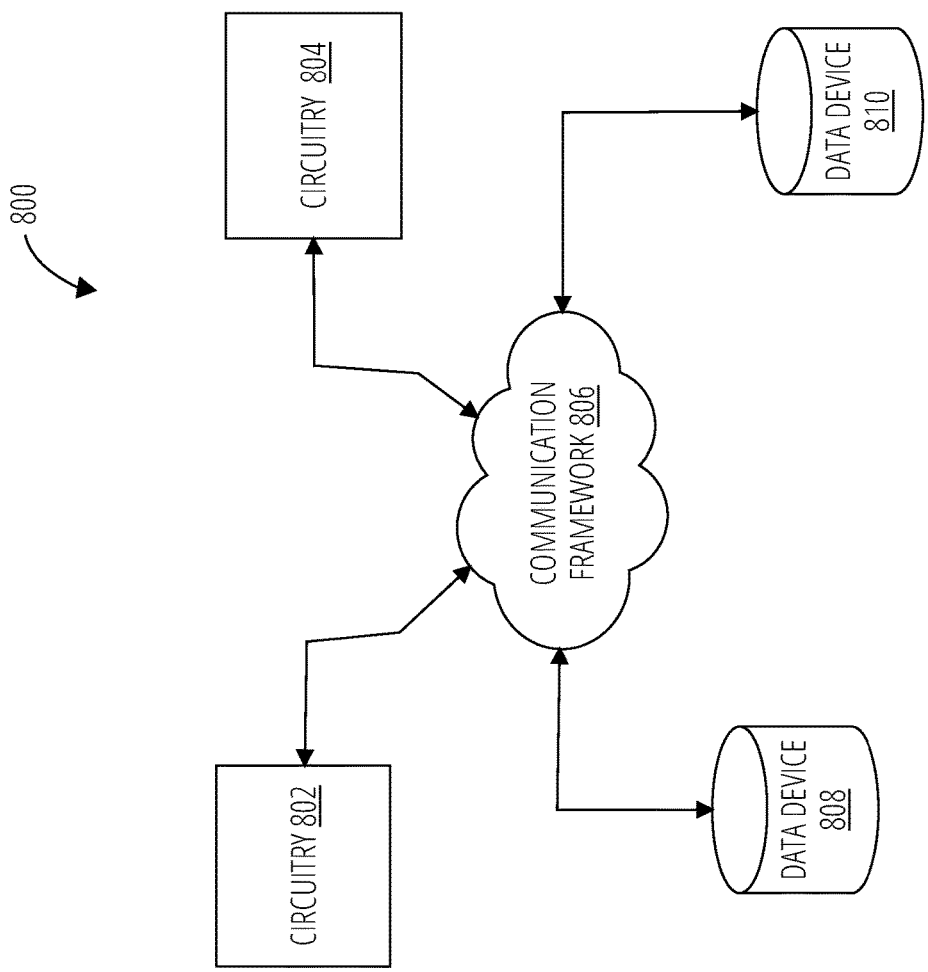
FIG. 8 illustrates an in-vehicle communication architecture 800 in accordance with at least one embodiment of the present disclosure.

FIG. 8 illustrates an in-vehicle communication architecture 800 according to one or more embodiments of the disclosure. For example, one or more vehicular devices, components, or circuits, such as circuitry 802 and/or circuitry 804, may communicate with each other via a communication framework 806, which may be an in-vehicle network, such as a CAN bus, implemented to facilitate establishing ground truth in the presence of an attacker.

The in-vehicle communication architecture 800 includes various common communications elements, such as a transmitter, receiver, transceiver, and so forth. The embodiments, however, are not limited to implementation by the in-vehicle communication architecture 800. As shown in this figure, the vehicular circuitry 802 and circuitry 804 may each be operatively connected to one or more respective data devices, such as, data device 808 and/or data device 810 that can be employed to store information local to the respective circuitry 802 and/or circuitry 804, such as fingerprints, distributions, densities, voltage signals, or the like. It may be understood that the circuitry 802 and circuitry 804 may be any suitable vehicular component, such as sensor, an ECU, microcontroller, microprocessor, processor, ASIC, field programmable gate array (FPGA), any electronic device, computing device, or the like. Moreover, it may be understood that one or more computing devices (containing at least a processor, memory, interfaces, etc.) may be connected to the communication framework 806 in a vehicle.

Further, the communication framework 806 may implement any well-known communications techniques and protocols. As described above, the communication framework 806 may be implemented as a CAN bus protocol or any other suitable in-vehicle communication protocol. The communication framework 806 may also implement various network interfaces arranged to accept, communicate, and connect to one or more external communications networks (e.g., Internet). A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. The communication framework 806 may employ both wired and wireless connections.

The components and features of the devices described above may be implemented using any combination of: processing circuitry, discrete circuitry, application specific integrated circuits (ASICs), logic gates and/or single chip architectures, etc. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodology, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A method, comprising:
generating an equalized distribution from one or more authentic messages transmitted, by an attacked electronic control unit (ECU), with a unique message identification (MID) based on a number of expected authentic messages and a total number of a plurality of messages received with the unique MID;
subtracting the equalized distribution from an accumulated distribution for messages transmitted with the unique MID to generate an attacker distribution;
determining, for one or more of a plurality of other distributions, whether an error between the attacker distribution and a one of the plurality of other distributions is less than or equal to a threshold error; and
generating a retrained distribution for the unique MID based on a difference between the attacker distribution and the accumulated distribution for messages transmitted with the unique MID responsive to a determination that the error between the attacker distribution and the one of the plurality of other distributions is less than or equal to the threshold error.

2. The method of claim 1, comprising updating a fingerprint associated with the unique MID based on the retrained distribution.

3. The method of claim 2, comprising flagging an ECU associated with the one of the plurality of other distributions as an attacker ECU responsive to the determination that the error between the attacker distribution and the one of the plurality of other distributions is less than or equal to the threshold error.

4. The method of claim 2, comprising:
generating the retrained distribution for the unique MID responsive to a determination that the error between the attacked distribution and the one or more of the plurality of other distributions is not less than or equal to the threshold error, comprising:
generating a second equalized distribution from inauthentic messages transmitted, by an attacker ECU, with the unique MID based on the number of expected authentic messages and the total number of the plurality of messages received with the unique MID;
subtracting the second equalized distribution from the accumulated distribution for messages transmitted with the unique MID to generate an authentic distribution;
determining whether and error between a distribution of a first message of the plurality of messages received with the unique MID and the authentic distribution is less than or equal to the threshold error; and
updating the fingerprint associated with the unique MID based on the distribution of the first message responsive to a determination that the error between the distribution of the first message of the plurality of messages received with the unique MID and the authentic distribution is less than or equal to the threshold error.

5. The method of claim 4, generating the retrained distribution for the unique MID responsive to a determination that the error between the attacked distribution and the one or more of the plurality of other distributions is not less than or equal to the threshold error, comprising:
determining whether and error between a distribution of a second message of the plurality of messages received with the unique MID and the authentic distribution is less than or equal to the threshold error; and updating the fingerprint associated with the unique MID based on the distribution of the second message responsive to a determination that the error between the distribution of the second message of the plurality of messages received with the unique MID and the authentic distribution is less than or equal to the threshold error.

6. The method of claim 3, comprising:

observing physical characteristics of a plurality of messages transmitted on a communication bus during a retraining period, wherein each of the plurality of messages comprise an indication of one of a plurality of unique MIDs, the unique MID a one of the plurality of unique MIDs;

updating, for each of the plurality of unique MIDs, a distribution associated the plurality of unique MIDs based on the observed physical characteristics of the plurality of messages; and determining, for each of the plurality of messages:
whether a distribution based on the observed physical characteristics of the one of the plurality of messages is within the threshold error to a one of the updated distributions associated with the plurality of MIDs, and incrementing a malicious frame counter based on a determination that the distribution based on the observed physical characteristics of the one of the plurality of messages is within the threshold error to the one of the updated distributions associated with the plurality of MIDs.

7. The method of claim 6, wherein the observed physical characteristics are an analog voltage associated with the message transmission.

8. The method of claim 6, wherein the bus is an in-vehicle network.

9. A computing apparatus comprising:

a processing circuitry; and a memory storing instructions that, when executed by the processing circuitry, cause the apparatus to:
generate an equalized distribution from one or more authentic messages transmitted, by an attacked electronic control unit (ECU), with a unique message identification (MID) based on a number of expected authentic messages and a total number of a plurality of messages received with the unique MID;

subtract the equalized distribution from an accumulated distribution for messages transmitted with the unique MID to generate an attacker distribution;

determine, for one or more of a plurality of other distributions, whether an error between the attacker distribution and a one of the plurality of other distributions is less than or equal to a threshold error; and generate a retrained distribution for the unique MID based on a difference between the attacker distribution and the accumulated distribution for messages transmitted with the unique MID responsive to a determination that the error between the attacker distribution and the one of the plurality of other distributions is less than or equal to the threshold error.

10. The computing apparatus of claim 9, the instructions when executed by the processing circuitry cause the apparatus to update a fingerprint associated with the unique MID based on the retrained distribution.

11. The computing apparatus of claim 10, the instructions when executed by the processing circuitry cause the apparatus to flag an ECU associated with the one of the plurality of other distributions as an attacker ECU responsive to the determination that the error between the attacker distribution and the one of the plurality of other distributions is less than or equal to the threshold error.

12. The computing apparatus of claim 10, the instructions when executed by the processing circuitry cause the apparatus to:

generate the retrained distribution for the unique MID responsive to a determination that the error between the attacked distribution and the one or more of the plurality of other distributions is not less than or equal to the threshold error, comprising:

generate a second equalized distribution from inauthentic messages transmitted, by an attacker ECU, with the unique MID based on the number of expected authentic messages and the total number of the plurality of messages received with the unique MID;

subtract the second equalized distribution from the accumulated distribution for messages transmitted with the unique MID to generate an authentic distribution;

determine whether and error between a distribution of a first message of the plurality of messages received with the unique MID and the authentic distribution is less than or equal to the threshold error; and update the fingerprint associated with the unique MID based on the distribution of the first message responsive to a determination that the error between the distribution of the first message of the plurality of messages received with the unique MID and the authentic distribution is less than or equal to the threshold error.

13. The computing apparatus of claim 12, the instructions when executed by the processing circuitry cause the apparatus to:

determine whether and error between a distribution of a second message of the plurality of messages received with the unique MID and the authentic distribution is less than or equal to the threshold error; and update the fingerprint associated with the unique MID based on the distribution of the second message responsive to a determination that the error between the distribution of the second message of the plurality of messages received with the unique MID and the authentic distribution is less than or equal to the threshold error.

14. The computing apparatus of claim 11, the instructions when executed by the processing circuitry cause the apparatus to:

observe physical characteristics of a plurality of messages transmitted on a communication bus during a retraining period, wherein each of the plurality of messages comprise an indication of one of a plurality of unique MIDs, the unique MID a one of the plurality of unique MIDs;

update, for each of the plurality of unique MIDs, a distribution associated the plurality of unique MIDs based on the observed physical characteristics of the plurality of messages; and determine, for each of the plurality of messages:
whether a distribution based on the observed physical characteristics of the one of the plurality of messages is within the threshold error to a one of the updated distributions associated with the plurality of MIDs, and incrementing a malicious frame counter based on a determination that the distribution based on the observed physical characteristics of the one of the plurality of messages is within the threshold error to the one of the updated distributions associated with the plurality of MIDs.

15. The computing apparatus of claim 14, wherein the observed physical characteristics are an analog voltage associated with the message transmission.

16. The computing apparatus of claim 14, wherein the bus is an in-vehicle network.

17. A non-transitory computer-readable storage medium, the computer-readable storage medium including instructions that when executed by processing circuitry of an intrusion detection system (IDS), cause the IDS to:
generate an equalized distribution from one or more authentic messages transmitted, by an attacked electronic control unit (ECU), with a unique message identification (MID) based on a number of expected authentic messages and a total number of a plurality of messages received with the unique MID;
subtract the equalized distribution from an accumulated distribution for messages transmitted with the unique MID to generate an attacker distribution;
determine, for one or more of a plurality of other distributions, whether an error between the attacker distribution and a one of the plurality of other distributions is less than or equal to a threshold error; and
generate a retrained distribution for the unique MID based on a difference between the attacker distribution and the accumulated distribution for messages transmitted with the unique MID responsive to a determination that the error between the attacker distribution and the one of the plurality of other distributions is less than or equal to the threshold error.

18. The computer-readable storage medium of claim 17, the instructions when executed by the processing circuitry of the IDS cause the IDS to update a fingerprint associated with the unique MID based on the retrained distribution.

19. The computer-readable storage medium of claim 18, the instructions when executed by the processing circuitry of the IDS cause the IDS to flag an ECU associated with the one of the plurality of other distributions as an attacker ECU responsive to the determination that the error between the attacker distribution and the one of the plurality of other distributions is less than or equal to the threshold error.

20. The computer-readable storage medium of claim 18, the instructions when executed by the processing circuitry of the IDS cause the IDS to:
generate the retrained distribution for the unique MID responsive to a determination that the error between the attacked distribution and the one or more of the plurality of other distributions is not less than or equal to the threshold error, comprising:
generate a second equalized distribution from inauthentic messages transmitted, by an attacker ECU, with the unique MID based on the number of expected authentic messages and the total number of the plurality of messages received with the unique MID;
subtract the second equalized distribution from the accumulated distribution for messages transmitted with the unique MID to generate an authentic distribution;
determine whether and error between a distribution of a first message of the plurality of messages received with the unique MID and the authentic distribution is less than or equal to the threshold error; and
update the fingerprint associated with the unique MID based on the distribution of the first message responsive to a determination that the error between the distribution of the first message of the plurality of messages received with the unique MID and the authentic distribution is less than or equal to the threshold error.

21. The computer-readable storage medium of claim 20, the instructions when executed by the processing circuitry of the IDS cause the IDS to:
determine whether and error between a distribution of a second message of the plurality of messages received with the unique MID and the authentic distribution is less than or equal to the threshold error; and
update the fingerprint associated with the unique MID based on the distribution of the second message responsive to a determination that the error between the distribution of the second message of the plurality of messages received with the unique MID and the authentic distribution is less than or equal to the threshold error.

22. The computer-readable storage medium of claim 19, the instructions when executed by the processing circuitry of the IDS cause the IDS to:
observe physical characteristics of a plurality of messages transmitted on a communication bus during a retraining period, wherein each of the plurality of messages comprise an indication of one of a plurality of unique MIDs, the unique MID a one of the plurality of unique MIDs;
update, for each of the plurality of unique MIDs, a distribution associated the plurality of unique MIDs based on the observed physical characteristics of the plurality of messages; and
determine, for each of the plurality of messages:
whether a distribution based on the observed physical characteristics of the one of the plurality of messages is within the threshold error to a one of the updated distributions associated with the plurality of MIDs, and
incrementing a malicious frame counter based on a determination that the distribution based on the observed physical characteristics of the one of the plurality of messages is within the threshold error to the one of the updated distributions associated with the plurality of MIDs.

23. The computer-readable storage medium of claim 22, wherein the observed physical characteristics are an analog voltage associated with the message transmission.

24. The computer-readable storage medium of claim 22, wherein the bus is an in-vehicle network.

* * * * *